United States Patent [19]

Laurent

[11] Patent Number: 5,171,394
[45] Date of Patent: Dec. 15, 1992

[54] METHOD AND APPARATUS OF MANUFACTURING A TIRE BY THE LAYING OF RUBBER PRODUCTS ONTO A FIRM SUPPORT

[75] Inventor: Daniel Laurent, Meylan, France

[73] Assignee: Compagnie Generale des Etablissements Michelin, Clermont-Ferrand Cedex, France

[21] Appl. No.: 522,545

[22] Filed: May 11, 1990

Related U.S. Application Data

[62] Division of Ser. No. 95,472, Sep. 10, 1987, Pat. No. 4,963,207.

[30] Foreign Application Priority Data

Sep. 17, 1986 [FR] France .................. 86 13104

[51] Int. Cl.⁵ ........................... B29D 30/16
[52] U.S. Cl. .................. 156/397; 156/405.1; 156/425; 156/447
[58] Field of Search ............ 156/117, 130, 244.13, 156/397, 425, 446, 405.1, 406.4, 356, 447; 425/380, 381

[56] References Cited

U.S. PATENT DOCUMENTS

| | | |
|---|---|---|
| 1,328,006 | 1/1920 | McLeod . |
| 3,116,194 | 12/1963 | Looser . |
| 3,223,572 | 12/1965 | Holloway et al. . |
| 3,268,380 | 8/1966 | Guichon et al. .............. 156/130 |
| 3,843,482 | 10/1974 | Wireman et al. . |
| 3,901,756 | 8/1975 | Wireman et al. . |
| 4,078,957 | 3/1978 | Bradt ..................... 156/244.13 X |
| 4,240,863 | 12/1980 | Vinton . |
| 4,279,683 | 7/1981 | Landsness . |
| 4,299,789 | 11/1981 | Giesbrecht . |
| 4,398,492 | 8/1983 | Casey ......................... 156/397 |
| 4,461,669 | 7/1984 | Dontscheff .................. 156/574 |

FOREIGN PATENT DOCUMENTS

| | | |
|---|---|---|
| 1729555 | 3/1972 | Fed. Rep. of Germany . |
| 3405931 | 8/1985 | Fed. Rep. of Germany . |
| 1048241 | 11/1966 | United Kingdom . |
| 1353903 | 5/1974 | United Kingdom . |
| 1538223 | 1/1979 | United Kingdom . |

Primary Examiner—Geoffrey L. Knable
Attorney, Agent, or Firm—Brumbaugh, Graves, Donohue & Raymond

[57] ABSTRACT

The rubber products forming a part of the structure of a tire are laid onto a rigid core by means of a volumetric extruder having an outlet orifice of small size positioned close to the surface on which the rubber is to be applied. The rubber products are built up by a meridian displacement of the orifice relative to the receiving surface with the extrusion of a controlled volume of rubber.

12 Claims, 3 Drawing Sheets

METHOD AND APPARATUS OF MANUFACTURING A TIRE BY THE LAYING OF RUBBER PRODUCTS ONTO A FIRM SUPPORT

This application is a division of application Ser. No. 095,472 filed on Sep. 10, 1987, now U.S. Pat. No. 4,963,207.

BACKGROUND OF THE INVENTION

This invention relates to the manufacture of tires, and, more particularly, to a method and apparatus for the laying of rubber products onto a firm surface or support in the manufacture of tires.

In the manufacture of a tire, various rubber products of different ingredients and properties are used. Such products are referred to as "compound" because they are prepared by the mixing of different base components. The initial preparation is effected by means of tools known as "internal mixers", one example of which is disclosed in U.S. Pat. No. 1,881,994. The compound thus obtained is then worked on calendaring machines and/or extruders (see, for example, U.S. Pat. No. 4,154,536) in order finally to obtain, by means of rolls and/or die blades of suitable dimensions and shape, a semi-finished product in the form of sheets of rubber or strips of small thickness, called flats, or in the form of profiled parts ready to be placed on the tire blank during its manufacture. U.S. Pat. No. 4,299,789 discloses one manner of obtaining a profiled rubber part.

The different semi-finished products thus produced are then assembled to form a raw tire blank, usually on a building drum, examples of which are disclosed in French patent Nos. 1,543,925 and 1,518,250. This method of manufacturing tires, which has been used conventionally in the industry, necessitates the manufacture of a large number of different flats or profiled rubber products in view of the great differences in the structures and dimensions of the tires.

Another reason for dissatisfaction with such prior art processes is the necessity for subjecting the raw rubber products to shaping during the fabrication of the tire. The fabrication ordinarily is carried out on a cylindrical or quasi-cylindrical building drum. By successive deformations, the tire blank approaches its final shape. Some of these rubber products must be capable of withstanding extensive deformations in the raw state. In the raw state, the rubber products must have mechanical properties sufficient to withstand the storage, handling, and laying operations without excessive deformation. All of these requirements result in limitations on the formulation of the rubber compounds, which limitations are dictated only by the process of manufacture of the tire and not by the characteristics of the use of such tire.

U.S. Pat. No. 1,328,006 discloses use of a rigid core instead of a deformable drum as support for the tire blank during its production. However, as the application of semi-finished products of raw rubber onto such a form is even more complicated than the laying of these products on a building drum, this manufacturing technique has been completely abandoned.

Methods which make it possible to eliminate production of semi-finished products of rubber have been described in connection with the recapping of tires. Thus, U.S. Pat. No. 3,223,572 describes a method of manufacturing a tread for a recapped tire which consists in suitably winding a large number of turns of a strip of rubber which has been previously prepared independently of the shapes and dimensions of the treads to be reconstituted. However, the precision afforded by this method leaves something to be desired since it is difficult to impart sufficient dimensional stability to such a strip, even by the use of intercalated sheets.

French patent No. 2,091,307 proposes recapping a tire by arranging a die blade having the profile desired for the tread directly on the periphery of the carcass to be capped and extruding rubber across said die blade by means of an extruder, which may be a volumetric extruder, while turning the tire by one revolution in order to obtain a complete tread. This method requires the production of a die blade for each tread profile required, exactly the same as upon the production of treads of semi-finished products.

SUMMARY OF THE INVENTION

The object of the present invention is to provide a method and apparatus of manufacturing tires which does away with the necessity of preparing numerous semi-finished products, as is required in the conventional methods of manufacture.

Another object of the present invention is to provide an improved method and apparatus of laying or applying rubber products onto a firm support which assures a very high precision of the laying of the rubber products in the manufacture of tires.

According to the invention, the method for the manufacture of a tire includes the successive build up of rubber products and reinforcement elements on a firm support so as to progressively build up the tire blank characterized by the fact that the application of at least certain rubber products is achieved by the use of at least one volumetric extruder having its outlet orifice positioned with respect to said firm support at the place where the rubber product is to be applied. The amount of rubber product applied on the firm support is controlled by the extrusion of a given volume in relation with the rotation of said support and the radius of laying, the profile of the rubber product to be produced being obtained by substantially meridian displacement of the said orifice with respect to the rotation of said laying surface.

DESCRIPTION OF THE DRAWINGS

The following figures illustrate the preferred mode of the invention and make possible an understanding of the structure, principle of operation and advantages thereof.

DETAILED DESCRIPTION OF THE INVENTION

In accordance with the invention, the method of manufacturing a tire by laying the rubber products onto a firm support is based on the application of a controlled "elementary" volume of rubber on a given circular arc of given radius.

A rubber product is characterized, on the one hand, by the rubber composition and, on the other hand, by the geometrical dimensions. Constituents having the shape and profile desired are obtained by multiplying the said elementary controlled volumes circumferentially, transversely and radially.

Figure 1:
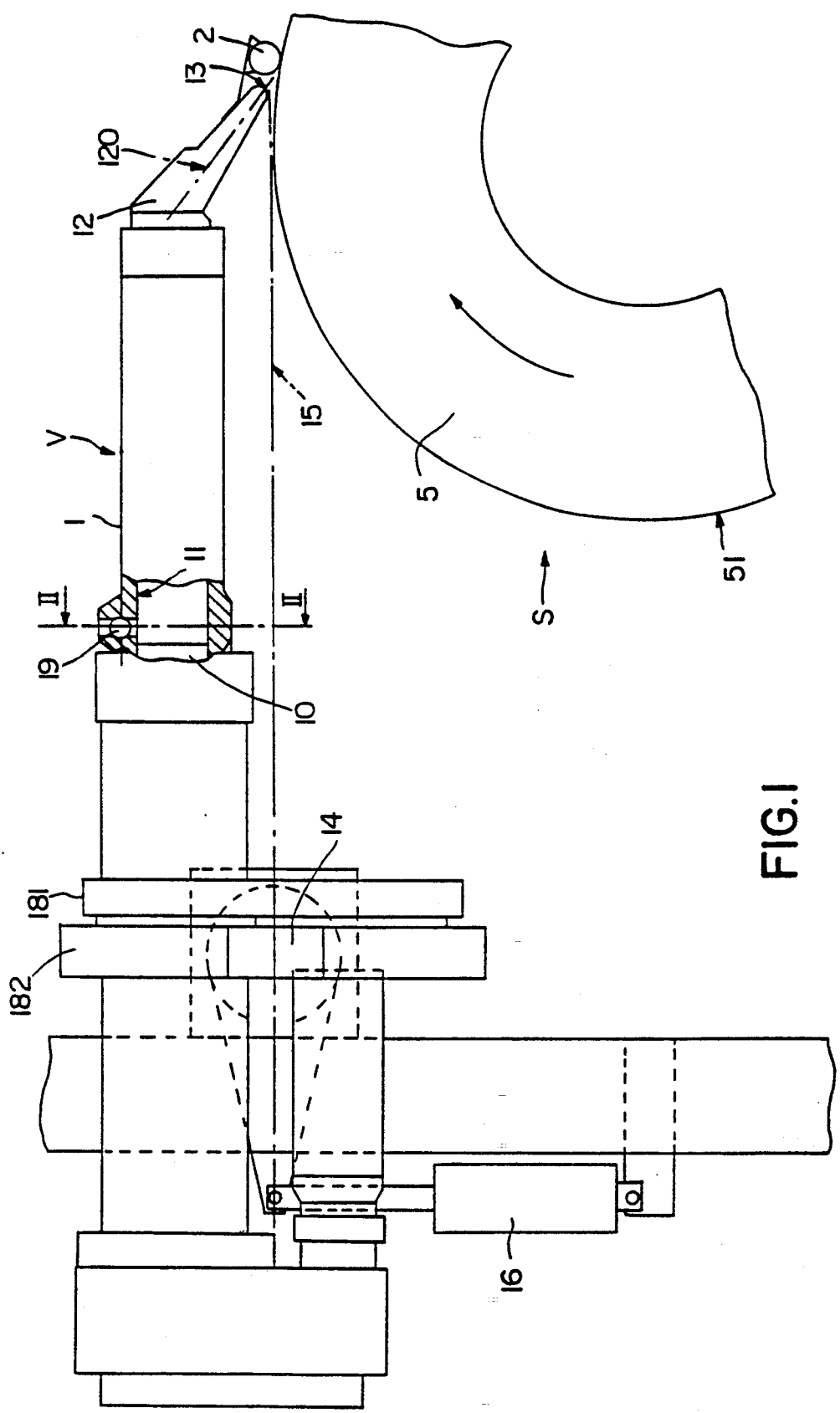
FIG. 1 is an elevational view of the extruding apparatus of the present invention.

FIG. 1 illustrates an apparatus for the carrying out of the process. The arrangement comprises a volumetric extruder V arranged on the periphery of the support S on which the tire is progressively built up. The extruder V, whose outlet opening delivers a given volume of rubber over a given radius for a given angle of rotation of the support S on which the tire blank is built, is characterized by the fact that the said outlet opening is an orifice 13 of small dimensions and by the fact that the said arrangement is adapted to provide a meridian movement of said orifice 13 with respect to the surface 51 onto which the rubber is applied. This meridian movement must be such as to permit the orifice 13 to approach and move away from the support S and, in addition, apply the rubber at any desired place on the surface 51 on which the rubber is placed. This requires a meridian displacement at small distance from the surface 51, as well as a movement away from the support when the underneath surface on which the rubber is applied is a layer of rubber applied during a preceding rotation of the support S.

In the method and apparatus of the invention, no feed chute is used to guide the rubber products towards the receiving surface. There is, therefore, no intermediary between the extrusion orifice 13 and the surface on which the rubber products are laid.

An application or spreading device, such as a trailing roller 2, can be provided behind the orifice 13. The roller 2 should be an idler and not a driven roller. Moreover, the movements in a meridian plane of such an application device are not driven. The idler roller 2 is mechanically connected to and carried behind the orifice 13 of the volumetric extruder.

The application of rubber products is determined by the volumetric extrusion of the rubber through the orifice 13 of small dimension onto a firm surface 51 and the relative movement between said orifice 13 and said surface 51. The term "firm surface" means a surface which does not undergo deformation under the effect of the force of application of the rubber, which may be substantial, particularly when an application device is used. The term "orifice 13 of small dimensions" means an orifice whose dimensions are substantially smaller than the dimensions of the cross-section of the product of rubber to be laid, making it possible to extrude rubber in the shape of a "strip" or a "cord", being able to build, in several turns, the desired final cross-section.

It is important to note that it is not the area of the outlet orifice of the volumetric extruder which controls the amount of rubber placed, but rather the extruding of a given volume for a given angle of rotation and a given radius of the support S. In the embodiment described, this orifice 13 has the shape of a slot. It is advisable to select an orifice which is as small as possible in order to obtain a good resolution in the production of the rubber product, which is compatible with the desired rate of working, and a shape which is compatible with the production of the said product. The extruded volume is deposited across a certain width which depends (among other factors) on the length of the slot constituting the orifice 13. Due to this laying technique, the starting and ending of the laying of the rubber products are very gradual, and since only negligible amounts of rubber are concerned as compared with the total volume of the tire, there results such a circumferential regularity that it is not necessary to observe any angle for the beginning of the laying of the different products. In other words, it is possible to begin the laying of the rubber whatever the position of the support S in its rotation.

The principle of volumetric extrusion, that is to say, extrusion of a controlled volume, is utilized in the invention in order to apply precise quantities of rubber. The extrusion is effected precisely at the place where the rubber must be laid in order to form the tire, thereby assuring great precision in the building of the tire, while being independent to a very large extent of the mechanical strength properties of the rubber in the unvulcanized state. This makes possible the use of compounds different from those heretofore used in the manufacture of tires since these compounds are not mechanically stressed by the laying process used.

The support S is preferably a removable rigid core 5 which makes it possible to define with great precision the shape of the inner surface of the tire. In this case, it is advantageous to use a mold, such as one of the type described in copending U.S. patent application Ser. No. 040,353 wherein the rigid core is used as a support for the tire blank during the fabrication of the tire and then constitutes a part of the mold during the subsequent vulcanization process. This makes it possible very effectively to prevent any movement of the raw rubber, thus avoiding any shaping during the manufacture of the tire.

The volumetric extruder V is formed of a tubular conduit 1 containing a piston 10 which slides within a cylindrical bore 11 of the tubular conduit 1, the cylindrical bore being extended by a nozzle 12 which terminates in a slot forming the outlet orifice 13 of the volumetric extruder.

It is necessary to impart to the volumetric extruder certain movements with respect to the rigid core 5 to progressively build up a tire blank on the rigid core. In this connection, the orifice 13 must move not only toward and away from the surface 51 of the core 5, but also transversely across the said surface 51. By combining these displacements relative to the rotation of the core 5, the orifice 13 can sweep over the entire surface of the core.

The movement of the orifice 13 toward and away from the surface 51 is achieved by having the volumetric extruder pivot on an axis 14 of a ring 182 carrying the extruder, which axis 14 is distant from the orifice 13 and arranged with respect to the core 5 such that the said orifice 13 describes around the axis of swing 14 a trajectory which intersects the surface onto which the rubber is applied. This makes it possible for the orifice 13 to move toward and away from the laying surface 51, as well as to move to positions adjacent said surface in the region where the sidewall of the future tire is to be built up on the core. It is also necessary to impart to the extruder V a movement transversely along the said axis 14 to sweep the orifice 13 transversely across the surface 51 and, in addition, in the most general case, it is necessary to permit the orifice 13 to rotate around an axis 15 perpendicular to the axis 14 and including the center of said orifice 13. Preferably, the axis 15 intersects the axis 14.

In order to facilitate the programming of the movements, the axis 14 extends parallel to the axis of rotation of the tire. The conduit 1 is oriented in any manner whatsoever with respect to the axis 14 of swing of the extruder V provided that the orifice 13 can reach the surface 51 wherever it is necessary to lay the rubber product. When the extruder V is pivoted on its axis 14, the orifice 13 preferably approaches the laying surface 51 along a trajectory which is substantially perpendicular to the surface 51, and the direction of extrusion of the rubber from the nozzle 12 forms an acute angle with respect to said surface 51, taking into account the direction of rotation of the core 5 (shown by the arrow on the core 5 on FIG. 1) during the laying of the rubber.

In order to position the orifice 13 with precision relative to the surface 51, the drive means for achieving these different movements of the extruder are preferably produced by electric position driven servo-motors. In this connection, the actuator 16 comprises such a motor and a screw-nut drive system through which movement in the direction of the axis of said screw is imparted. Thus, the pivotal movement of the extruder V about its axis 14 is controlled by the motor driven actuator 16 which pivots the ring 182 about the axis 14. The translation of the extruder V along the axis 14 to displace the orifice 13 transversely of the surface 51 is controlled by a similar motor driven actuator 17 which displaces the ring 182 along the axis 14. Moreover, the rotation of the orifice 13 about the axis 15 is controlled by a position driven servo-motor 18 and belt drive which rotates a crown 181 which supports the volumetric extruder V for rotation with respect to the ring 182.

In order to permit the orifice 13 to reach the region of the beads of the tire, the axis 120 of the nozzle 12 is inclined with respect to the axis of the conduit 1. In other words, the orifice 13 is remote from the axis of the conduit 1.

The drawings illustrate a preferred embodiment of the extruder V in which a roller 2 is provided as the application means for promoting the adherence of the raw rubber to the surface 51 on which it is laid. The axis of rotation of the roller 2 can have a degree of freedom of swing about an axis perpendicular to its axis of rotation, and substantially parallel to the surface 51 on which rubber is laid, which makes it possible to eliminate the drive means for the orientation of the conduit 1 about the axis 15 when the surface on which rubber is laid has only small inclinations with respect to a general transversal orientation. In this connection, a tread can be built upon the firm support using only the motor driven actuators 16 and 17 and eliminating the motor drive 18.

In the example described, the capacity of the conduit 1 is greater than or equal to the volume of rubber product to be laid for the manufacture of a tire, that is to say, it contains the volume of rubber necessary to lay the product in the case of the largest tire to be manufactured.

Figure 2:
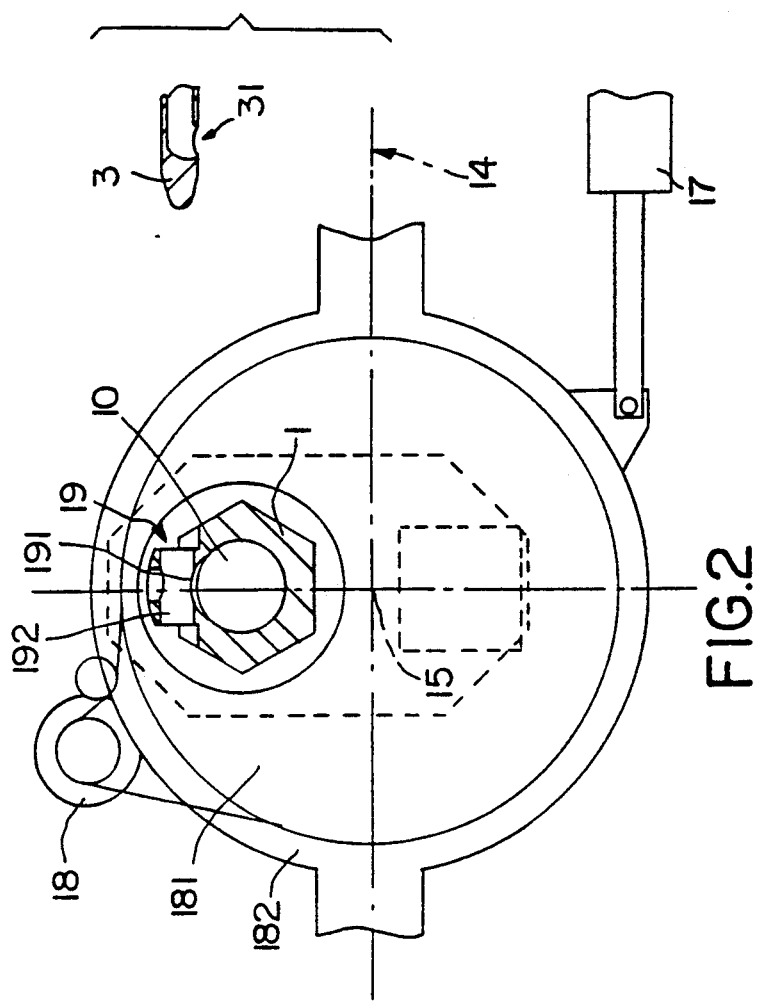
FIG. 2 is a section along the line II—II of FIG. 1.
Figure 3:
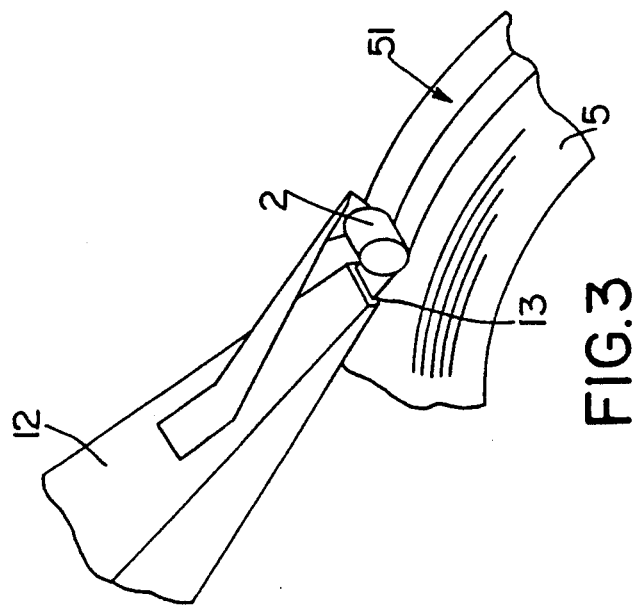
FIG. 3 is a perspective view of the outlet orifice for the extruder.

For initially charging the conduit 1 with rubber, a feed opening 19 (see FIGS. 1 and 2) is provided in front of the piston 10 when the latter is in its position of maximum retraction. The feed opening 19 includes a radial passage 191 communicating with the cylindrical bore 11 of the conduit 1 and an upwardly extending portion 192 having a passage therein for receiving a nose 3 which supplies the rubber from a source via tubing. The nose 3 and the portion 192 are designed as male and female telescoping parts. The nose has an opening 31 which, in telescoping relation with the passage of the portion 192, is aligned with the passage 191 into the cylindrical bore to permit flow of the rubber into the cylindrical bore. Due to the drive means for the pivotal and transverse movements of the volumetric extruder V, the filling orifice 19 of the extruder is brought into communication with the nose 3, which stays in motionless position, for charging of the conduit 1. The rubber is charged into the conduit 1 until a pressure probe disposed in the nozzle 12 detects that the cylindrical bore 11 is full.

Figure 4:
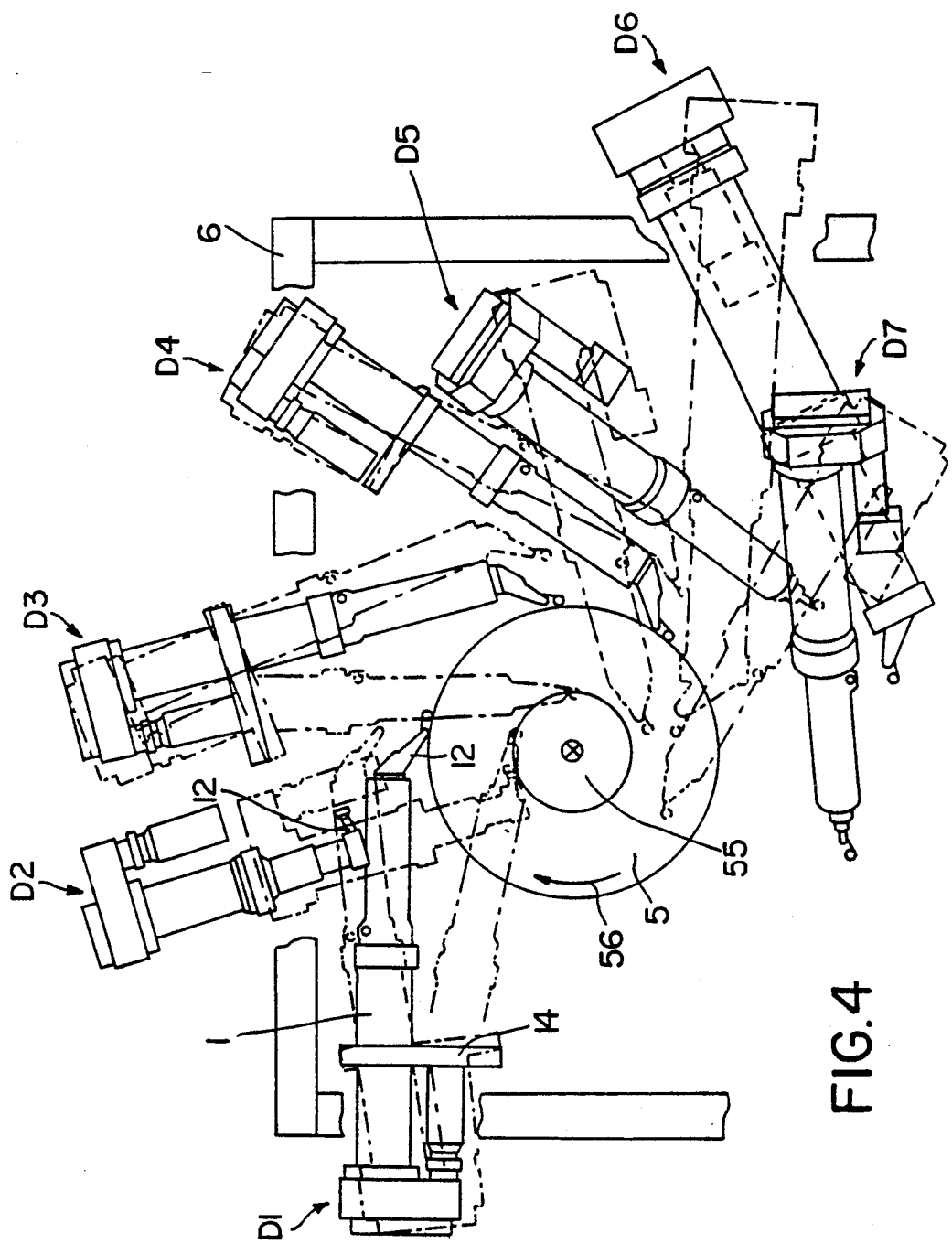
FIG. 4 is a side elevation showing a plurality of extruders for the application of the rubber products used in a tire.

FIG. 4 illustrates a machine for the laying of rubber products in the manufacture of a tire, said machine comprising, a plurality of devices D1 to D7. A gantry 6 (shown only in part in order not to conceal the essential elements of the machine) surrounds a removable rigid core 5 on which the tire is built. The insertion and extraction of the core 5 can be achieved by the displacement of the core along the axis of the core designated by the reference numeral 55. Drive means rotates the core 5 in the direction of the arrow 56.

The apparatus shown in FIG. 4 has a plurality of extruding devices D1 to D7 for the application of rubber products on the core 5, as described above. One device of this kind has been provided for each type of rubber (that is to say, composition of compound) to be laid. In order to save laying time, it is possible to use more than one device per type of rubber.

The device D1 is used for the laying of the inner layer of the tire. D1 is shown in solid lines in position to lay rubber products in the region of the tread of the future tire. D1 is also shown in broken lines in two positions, namely, with its nozzle 12 raised, a position which corresponds to an inactive or charging position, and with its nozzle below the solid line position, a position which corresponds to the laying of rubber in the region for forming the beads. It will be understood that in order to reach this region, it has been necessary to use all three possible movements, namely, transverse movement along the axis 14 of swing, pivotal motion about the said axis 14 and rotation of the conduit 1 about the axis 15.

The device D2 is used for the laying of a rubber product in the vicinity of a bead wire. The nozzle 12 is oriented in a plane substantially perpendicular to the axis of the conduit. This device D2 includes a variant in the way to provide movements to the extruder; namely, it is a translation along the axis 15 in combination with the pivotal swinging motion on the axis 14 that makes it possible to impart the necessary movements to the extruder.

The apparatus described is used preferably in combination with the means for the manufacture of carcasses and tire belts described in copending U.S. patent applications Ser. Nos. 040,360 and 057,250. A particularly advantageous manner of laying the layer of rubber which promotes adherence of the reinforcement cords, as described in said two patent applications, consists in using a laying device, such as D3, for the carcass and another, such as D4, for the belt.

The devices D5, D6, and D7 assure the laying of rubber in the vicinity of the bead wire, the tread and the sidewalls, respectively. Two such devices D2, D5 and D7 are preferably used, but only one of each has been shown here.

The present invention provides a precise and economical way of laying of the rubber products used in the build up of a tire blank. The devices D1 to D7 for applying the rubber are distributed around the core 5 in such a manner that all have access to the core without axial displacement of said core 5. Preferably, said devices are arranged so that several of them can operate simultaneously. It is possible to attach to the same gantry 6 a machine for the manufacture of a reinforcement of the type described in copending U.S. patent application Ser. No. 057,250 and to make the belt during the operation of certain of the devices D1 to D7. All of these variations are within the scope of the skill in the art.

As a result of the process and arrangement of the invention, not only is it possible to produce all the variations in thickness of rubber transversely, which is conventional in the building of tires with so-called "profiled" products, but in addition, it is possible to control a variation in the thickness of the products in accordance with the angular position in the future tire, which provides additional latitude in the design of the tire and makes it possible, in particular, to lay the rubber of treads with aggressive tread pattern in a configuration closer to the final arrangement, which decreases the movements of the rubber during the molding. It is further possible to lay the rubber intermittently or to lay it only in a circular arc.

I claim:

1. An apparatus for the laying of rubber products in the manufacture of a tire, comprising a rotatable firm support having an outer surface on which a tire blank is gradually built up during a plurality of revolutions of the rotatable support, the outer surface of the support defining the shape of the inner surface of the tire, a volumetric extruder having an outlet opening adjacent the outer surface of the rotatable support, means for delivering a given volume of rubber for a given radius and a given angle of rotation of the support on which the tire blank is built, said outlet opening being an orifice of small dimensions in relation to the surface on which the blank is built up during a plurality of revolutions and means adapted to provide a meridian relative movement of said orifice with respect to the outer surface on which the rubber is to be applied during the rotation of the surface.

2. An apparatus according to claim 1, in which the said volumetric extruder includes a conduit having a piston sliding within a bore of the conduit, and a nozzle extending from the conduit toward the surface and terminating in such outlet opening for laying the rubber on the rotatable support.

3. An apparatus according to claim 1, including a rotary roller behind said outlet opening for the application of the rubber on said rotary surface.

4. An apparatus according to claim 3, characterized by the fact that said roller has a degree of freedom of swing around an axis perpendicular to its axis of rotation.

5. An apparatus according to claim 1, in which said means adapted to provide meridian relative movement of said orifice with respect to the surface onto which the rubber is to be applied comprise a pivotal axis parallel to the axis of rotation of the support and around which the said volumetric extruder is arranged, said axis being remote from said orifice and arranged with respect to said rotatable support in such a manner that said orifice describes around said axis a trajectory toward and away from said surface onto which the rubber is applied, means for pivoting the extruder about said axis, and means for providing a transversal movement along said axis.

6. An apparatus according to claim 1, in which the means adapted to provide meridian relative movement between said orifice and said rubber receiving surface comprise a pivotal axis parallel to the axis of rotation of the support and around which the said volumetric extruder is arranged, the said axis being remote from said orifice and arranged with respect to said rotatable support in such a manner that said orifice describes around said axis a trajectory toward and away from said surface onto which the rubber is applied, means for pivoting the extruder about said axis, and means for providing a translation along an axis perpendicular to said pivotal axis, the said perpendicular axis including the center of said orifice.

7. An apparatus according to claim 6 including means for pivotally orienting the orifice around said axis perpendicular to said pivotal axis, and including the center of said orifice.

8. An apparatus according to claim 1 in which said meridian relative movement includes pivotal movement about an axis parallel to the axis of rotation of the support to move the orifice toward and away from said surface on which the rubber is applied and in which said orifice is remote from the axis of the volumetric extruder.

9. An apparatus according to claim 2, in which the useful capacity of the conduit is greater than or equal to the volume of rubber product to be laid for the building of a tire.

10. An apparatus according to claim 2, in which said conduit includes a rubber feed opening in front of the piston when the latter is in its maximum rearward position, and a telescoping coupling for connecting said rubber feed opening with a source of supply of said rubber.

11. An apparatus as set forth in claim 1 including a gantry surrounding said rotatable support and supporting at least one said volumetric extruder relative to said rotatable support.

12. An apparatus for manufacturing a tire comprising a rotatable support having an outer surface on which a stream of rubber product is deposited for progressively building a blank of the tire during a plurality of revolutions of said rotatable support, the outer surface of the support defining the shape of the inner surface of the tire, a volumetric extruder, a chamber forming part of said volumetric extruder for receiving the rubber product, an outlet orifice adjacent the outer surface of the rotatable support and of small size in relation to the surface on which the blank is built up in a plurality of rotations of the support, volumetric extruding means within said chamber for discharging a controlled volume of rubber product from the chamber through the outlet orifice, the volume displaced by the movement of the extruding means relative to the chamber being the volume of the material discharged from the orifice during said displacement, means for controlling the displacement of the extruding means relative to the chamber to lay down continuously a controlled amount of rubber product of predetermined volume at each location along the circumference of the rotating surface where the rubber product is to be laid in relation with the rotation of the support and the radius of laying, and means for providing a meridian displacement of said orifice relative to the surface on which the rubber is to be applied during the rotation of the surface.

* * * * *